(12) United States Patent
Larson

(10) Patent No.: US 10,877,563 B2
(45) Date of Patent: Dec. 29, 2020

(54) HAPTIC ACTUATOR INCLUDING OVERMOLDED FIELD MEMBER AND RELATED METHODS

(71) Applicant: APPLE INC., Cupertino, CA (US)

(72) Inventor: Nils E. Larson, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/860,504

(22) Filed: Apr. 28, 2020

(65) Prior Publication Data

US 2020/0257368 A1 Aug. 13, 2020

Related U.S. Application Data

(63) Continuation of application No. 16/233,867, filed on Dec. 27, 2018, now Pat. No. 10,719,130.

(51) Int. Cl.
*G06F 3/01* (2006.01)
*H04M 1/02* (2006.01)

(52) U.S. Cl.
CPC ............ *G06F 3/016* (2013.01); *H04M 1/026* (2013.01)

(58) Field of Classification Search
CPC ............................... G06F 3/016; H04M 1/026
See application file for complete search history.

(56) References Cited

U.S. PATENT DOCUMENTS

| 6,075,359 | A | 6/2000 | Van Fleet, III |
| 8,169,402 | B2 | 5/2012 | Shahoian et al. |
| 9,048,718 | B2 * | 6/2015 | Zhang .................... H02K 33/02 |
| 2010/0213773 | A1 | 8/2010 | Dong et al. |
| 2011/0291947 | A1 * | 12/2011 | Pemberton-Pigott ........ G06F 1/1643 345/173 |
| 2012/0049660 | A1 * | 3/2012 | Park ........................ B06B 1/045 310/25 |

(Continued)

FOREIGN PATENT DOCUMENTS

| WO | 2013169299 | 11/2013 |
| WO | 2013169303 | 11/2013 |

(Continued)

OTHER PUBLICATIONS

Product Specification Sheet: GEEPLUS VIBRO1 Vibration Actuator, 2 pages, www.geeplus.biz, downloaded on Jul. 15, 2015. See Priority U.S. Appl. No. 16/233,867, filed Dec. 27, 2018.

*Primary Examiner* — Quan-Zhen Wang
*Assistant Examiner* — Mancil Littlejohn, Jr.
(74) *Attorney, Agent, or Firm* — Allen, Dyer, Doppelt, + Gilchrist, P.A. Attorneys at Law

(57) ABSTRACT

A haptic actuator may include a housing, a coil carried by the housing, and a field member movable within the housing responsive to the coil. The field member may include a frame having opposing first and second ends, at least one magnet carried by the frame, and a first overmolded endcap coupled to the first end of the frame. The field member may also include a second overmolded endcap coupled to the second end of the frame. The haptic actuator may include a first flexure having an inner end coupled to the first overmolded endcap, and an outer end coupled to adjacent portions of the housing. The haptic actuator may also include a second flexure having an inner end coupled to the second overmolded endcap, and an outer end coupled to adjacent portions of the housing.

21 Claims, 6 Drawing Sheets

(56) References Cited

U.S. PATENT DOCUMENTS

| | | | |
|---|---|---|---|
| 2012/0169151 A1* | 7/2012 | Dong | H02K 33/16 310/25 |
| 2014/0197936 A1 | 7/2014 | Biggs et al. | |
| 2015/0109223 A1 | 4/2015 | Kessler et al. | |
| 2015/0116205 A1 | 4/2015 | Westerman et al. | |
| 2015/0130730 A1 | 5/2015 | Harley et al. | |
| 2016/0062464 A1* | 3/2016 | Moussette | G06F 3/016 345/173 |
| 2016/0063850 A1* | 3/2016 | Yang | H04M 19/04 340/539.22 |
| 2017/0039824 A1* | 2/2017 | Hajati | G06F 3/016 |
| 2017/0285747 A1 | 10/2017 | Chen | |
| 2018/0364806 A1 | 12/2018 | El-Ouardi et al. | |

FOREIGN PATENT DOCUMENTS

| | | |
|---|---|---|
| WO | 2013169305 | 11/2013 |
| WO | 2013170099 | 11/2013 |
| WO | 2013188307 | 12/2013 |
| WO | 2014018111 | 1/2014 |
| WO | 2015020663 | 2/2015 |

* cited by examiner

HAPTIC ACTUATOR INCLUDING OVERMOLDED FIELD MEMBER AND RELATED METHODS

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

A haptic actuator may include a housing and at least one coil carried by the housing. The haptic actuator may also include a field member movable within the housing responsive to the at least one coil. The field member may include a frame having opposing first and second ends, at least one magnet carried by the frame, and a first overmolded endcap coupled to the first end of the frame. The field member may also include a second overmolded endcap coupled to the second end of the frame. The haptic actuator may also include a first flexure having an inner end coupled to the first overmolded endcap, and an outer end coupled to adjacent portions of the housing. The haptic actuator may further include a second flexure having an inner end coupled to the second overmolded endcap, and an outer end coupled to adjacent portions of the housing.

The first end of the frame may be embedded into the first overmolded endcap, and the second end of the frame may be embedded into the second overmolded endcap. The inner end of the first flexure may be embedded into the first overmolded endcap, and the inner end of the second flexure is embedded into the second overmolded endcap, for example.

The frame may have at least one magnet receiving opening extending therethrough. The frame may include an overmolded magnet receiving holder coupled to the frame and lining the at least one magnet receiving opening, and at least one magnet within the at least one magnet receiving opening.

The at least one magnet receiving opening may include a pair of side-by-side magnet receiving openings. The at least one magnet may include a pair of magnets, for example.

The haptic actuator may include a first overmolded flexure mount coupled to the outer end of the first flexure and carried by the housing, for example. The haptic actuator may also include a second overmolded flexure mount coupled to the outer end of the second flexure and carried by housing.

The outer end of the first flexure may be embedded within the first overmolded flexure mount. The outer end of the second flexure may be embedded within the second overmolded flexure mount. The first overmolded flexure mount may include a first flexure mounting portion and a first flange mounting portion integrally formed therewith, and the second flexure mount may include a second flexure mounting portion and a second flange mounting portion integrally formed therewith, for example.

The frame may include metal, for example. The first and second flexures may each include metal, and the first and second overmolded endcaps may each include plastic.

A method aspect is directed to a method of making a haptic actuator. The method may include mounting at least one coil within a housing and mounting a field member movable within the housing responsive to the at least one coil. The field member may include a frame having opposing first and second ends, at least one magnet carried by the frame, a first overmolded endcap coupled to the first end of the frame, and a second overmolded endcap coupled to the second end of the frame. The method may also include coupling a first flexure having an inner end to the first overmolded endcap, and coupling an outer end to adjacent portions of the housing. The method may further include coupling a second flexure having an inner end to the second overmolded endcap, and coupling an outer end to adjacent portions of the housing.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
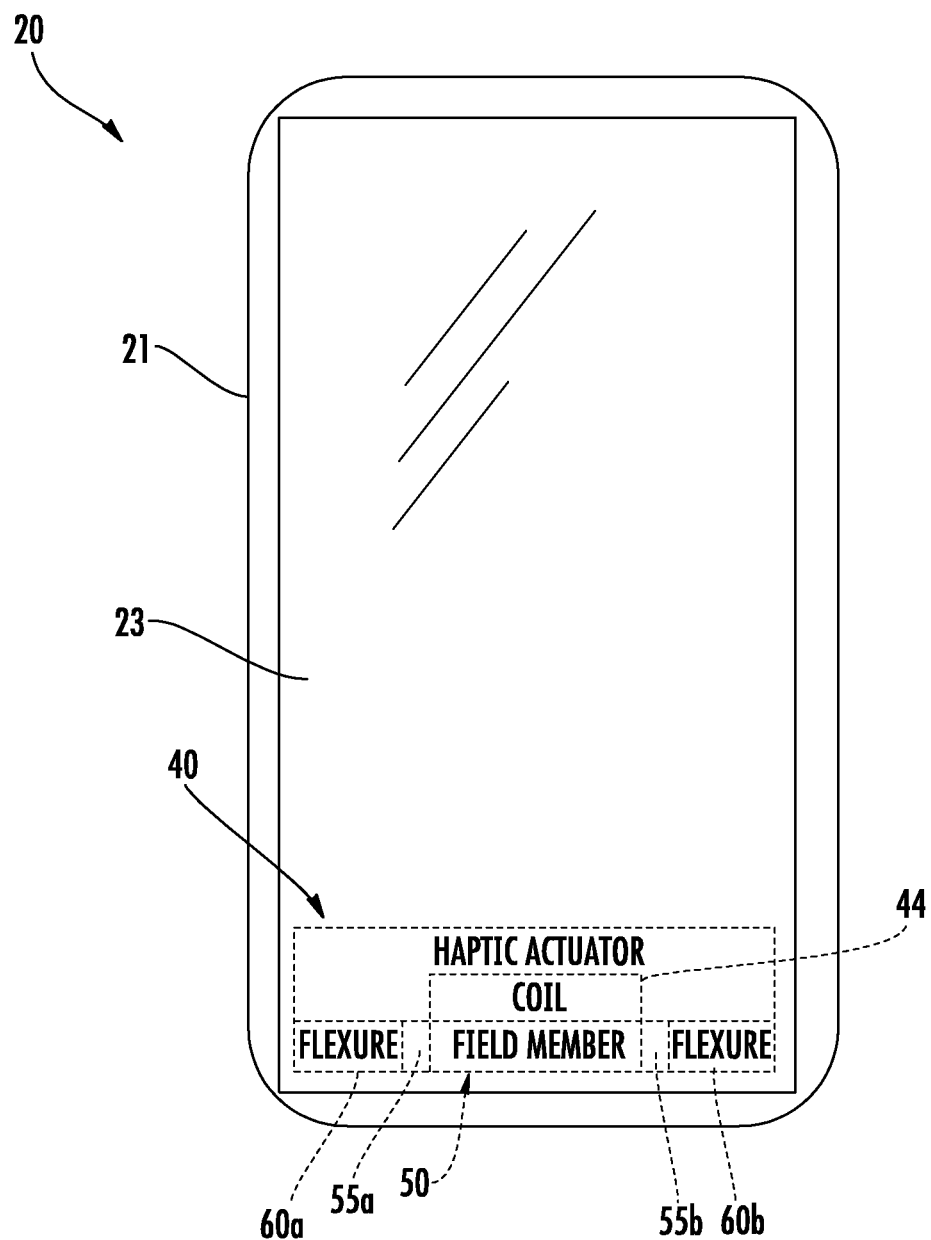
FIG. 1 is a schematic diagram of an electronic device in accordance with an embodiment.
Figure 2:
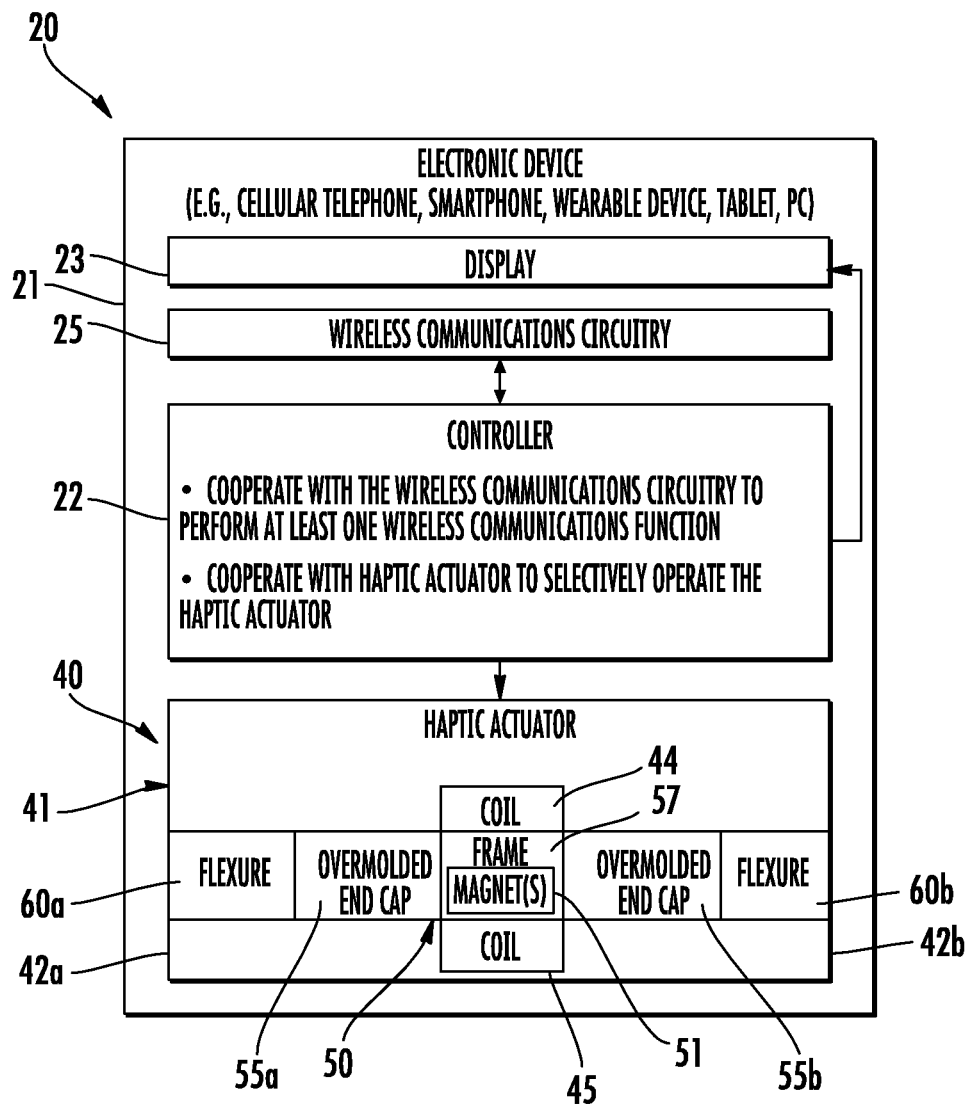
FIG. 2 is another schematic diagram of the electronic device of FIG. 1.

Referring initially to FIGS. 1-2, an electronic device 20 illustratively includes a device housing 21 and a controller 22 carried by the device housing. The electronic device 20 is illustratively a mobile wireless communications device, for example, a cellular telephone or smartphone. The electronic device 20 may be another type of electronic device, for example, a wearable device (e.g., a watch), a tablet computer, a laptop computer, etc.

Wireless communications circuitry 25 (e.g. cellular, WLAN Bluetooth, etc.) is also carried within the device housing 21 and coupled to the controller 22. The wireless communications circuitry 25 cooperates with the controller 22 to perform at least one wireless communications function, for example, for voice and/or data. In some embodiments, the electronic device 20 may not include wireless communications circuitry 25.

A display 23 is also carried by the device housing 21 and is coupled to the controller 22. The display 23 may be, for example, a light emitting diode (LED) display, a liquid crystal display (LCD), or may be another type of display, as will be appreciated by those skilled in the art. The display 23 may be a touch display and may cooperate with the controller 22 to perform a device function in response to operation thereof. For example, a device function may include a powering on or off of the electronic device 20, initiating communication via the wireless communications circuitry 25, and/or performing a menu function.

The electronic device 20 illustratively includes a haptic actuator 40. The haptic actuator 40 is coupled to the controller 22 and provides haptic feedback to the user in the form of relatively long and short vibrations. The vibrations may be indicative of a message received, and the duration and type of the vibration may be indicative of the type of message received. Of course, the vibrations may be indicative of or convey other types of information.

While a controller 22 is described, it should be understood that the controller 22 may include one or more of a processor and other circuitry to perform the functions described herein. For example, the controller 22 may include a class-D amplifier to drive the haptic actuator 40 and/or sensors for sensing voltage and current.

The haptic actuator 40 includes an actuator housing 41 that may be metal, for example. The actuator housing 41 may be another type of material or include more than one type of material. The actuator housing 41 has opposing ends 42*a*, 42*b*. The actuator housing 41 illustratively has a dimension in a length direction greater than a width direction (e.g., x-axis travel direction). The haptic actuator 40 also includes first and second coils 44, 45 carried by the actuator housing 41, for example, the top and the bottom, respectively. The first and second coils 44, 45 may each have a loop shape or "racetrack" shape and are aligned in a stacked relation and spaced apart. There may be any number of first and second coils 44, 45 as will be appreciated by those skilled in the art.

The haptic actuator 40 also includes a field member 50 within the actuator housing 41 that is responsive to the first and second coils 44, 45. The field member 50, similarly to the actuator housing 41, has a dimension in a length direction greater than a width direction. Thus, the field member 50 is reciprocally movable in the length direction (i.e., the x-axis direction). While the movement of the field member 50 is described as being moveable in one direction, i.e., a linear haptic actuator, it should be understood that in some embodiments, the field member may be movable in other directions, i.e., an angular haptic actuator, or may be a combination of both a linear and an angular haptic actuator.

Figure 3:
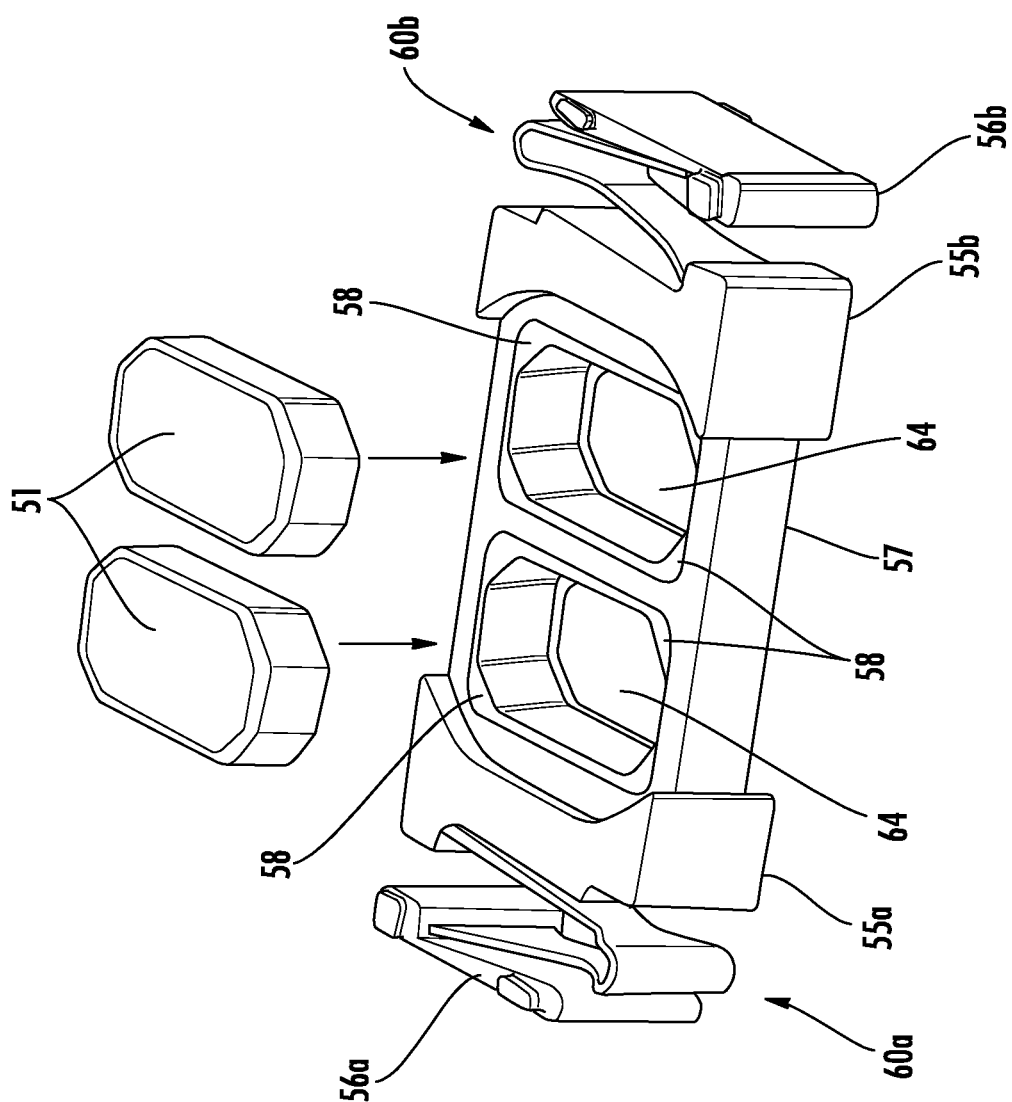
FIG. 3 is a more detailed schematic diagram of the haptic actuator of FIG. 2.
Figure 4:
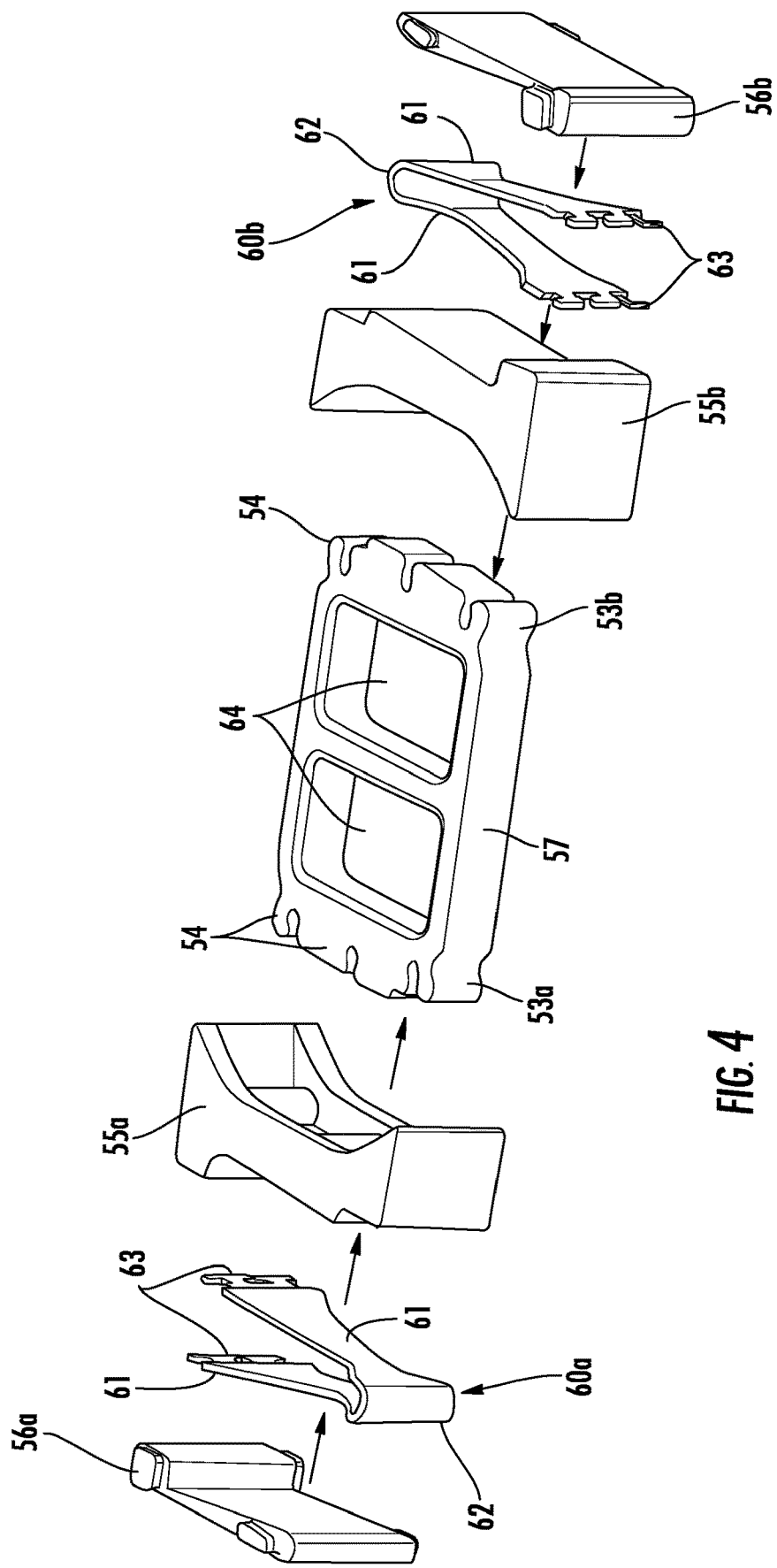
FIG. 4 is another schematic diagram of a portion of the haptic actuator of FIG. 3.

Referring now additionally to FIGS. 3-4, the field member 50 includes a frame 57 that defines a mass. The frame 57 has opposing first and second ends 53*a*, 53*b*. The frame 57 may be metal, for example, tungsten. The frame 57 may be a different material (e.g., relatively heavy material). The frame 57 illustratively includes cleating 54 at the opposing ends 53*a*, 53*b*. Cleating 54 may be included in other areas, for example, relatively high-stress areas.

The field member 50 also includes a pair of permanent magnets 51 carried by the frame 57 and between the first and second coils 44, 45. More particularly, the permanent magnets 51 are configured in side-by-side relation and carried within respective side-by-side magnet receiving openings 64. An overmolded magnet receiving holder 58 is coupled to the frame 57 and lines the magnet receiving openings 64 to receive the permanent magnets 51 therein. An adhesive may secure the permanent magnets 51 within the overmolded magnet receiving holder 58. Additionally, the permanent magnets 51 may each include a protrusion or interference features to assist in press fitting the permanent magnets within the overmolded magnet receiving holder 58. The permanent magnets 51 may be press-fitted to a magnetic center to reduce or minimize magnetic flux bias, as will be appreciated by those skilled in the art.

The permanent magnets 51 may be neodymium, for example, and may be positioned in opposing directions with respect to their respective poles. The permanent magnets 51 may also have a rounded rectangle shape and may be aligned along a length of the first and second coils 44, 45. There may be any number of permanent magnets 51 having any shape between the first and second coils 44, 45. In some embodiments, the coils 44, 45 may be carried by the field member 50 and the permanent magnets 51 carried by the housing (i.e., movable coils).

The field member 50 illustratively includes a first overmolded endcap 55*a* coupled to the first end 53*a* of the frame 57. More particularly, the first end 53*a* of the frame 57 (e.g., the cleating 54) is embedded into the first overmolded endcap 55*a*. The first overmolded endcap 55*a* may be plastic, such as a thermosetting or thermoplastic material. The first overmolded endcap 55*a* may be another material or may include additional materials. For example, tungsten powder (to increase the weight) or glass (to increase the strength) may be included within the first overmolded endcap 55*a*.

A second overmolded endcap 55*b* is coupled to the second end 53*b* of the frame 57. More particularly, similarly to the first end 53*a*, the second end 53*b* of the frame (e.g., the cleating 54) is embedded into the second overmolded endcap 55*b*. The second overmolded endcap 55*b* may be plastic. The second overmolded endcap 55*b* may be another material or may include additional materials. For example, tungsten powder or glass may be included within the second overmolded endcap 55*b*.

Illustratively, the first and second overmolded endcaps 55*a*, 55*b* each have a curved shape about the frame 57 so that the exposed areas of the frame define a coil shape. The coil shape may maximize the use of the limited volume, as will be appreciated by those skilled in the art.

The haptic actuator 40 also includes a first flexure 60*a* having an inner end coupled to, for example, embedded into, the first overmolded endcap 55*a*. The first flexure 60*a* also has an outer end coupled to adjacent portions of the actuator housing 41. More particularly, a first overmolded flexure mount 56*a* is coupled to the outer end of the first flexure 60*a* and carried by the actuator housing 41. The outer end of the first flexure 60*a* is embedded within the first overmolded flexure mount 56*a*.

The first flexure 60*a* illustratively includes two diverging arms 61 joined together by a bend 62. The two diverging arms 61 have cleating 63 at distal ends opposite the bend 62. The cleating 63 is illustratively encapsulated by the first overmolded flexure mount 56*a* and the first overmolded endcap 55*a*. The first flexure 60*a* may be metal, for example. Of course, the first flexure 60*a* may be another material or may include other and/or additional materials. While a single first flexure 60*a* is illustrated, there may be more than one first flexure.

The haptic actuator 40 also includes a second flexure 60*b* having an inner end coupled to, for example, embedded into, the second overmolded endcap 55*b*. The second flexure 60*b* also has an outer end coupled to adjacent portions of the actuator housing 41. More particularly, a second overmolded flexure mount 56*b* is coupled to the outer end of the second flexure 60*b* and carried by the actuator housing 41. The outer end of the second flexure 60*b* is embedded within the second overmolded flexure mount 56*b*.

The second flexure 60*b*, similarly to the first flexure 60*a*, illustratively includes two diverging arms 61 joined together by a bend 62. The two diverging arms 61 have cleating 63 at distal ends opposite the bend 62. The cleating 63 is illustratively encapsulated by the second overmolded flexure mount 56*b* and the second overmolded endcap 55*b*. The second flexure 60*b* may be metal, for example. Of course, the second flexure 60*b* may be another material or may include other and/or additional materials. While a single second flexure 60*b* is illustrated, there may be more than one second flexure.

Figure 5:
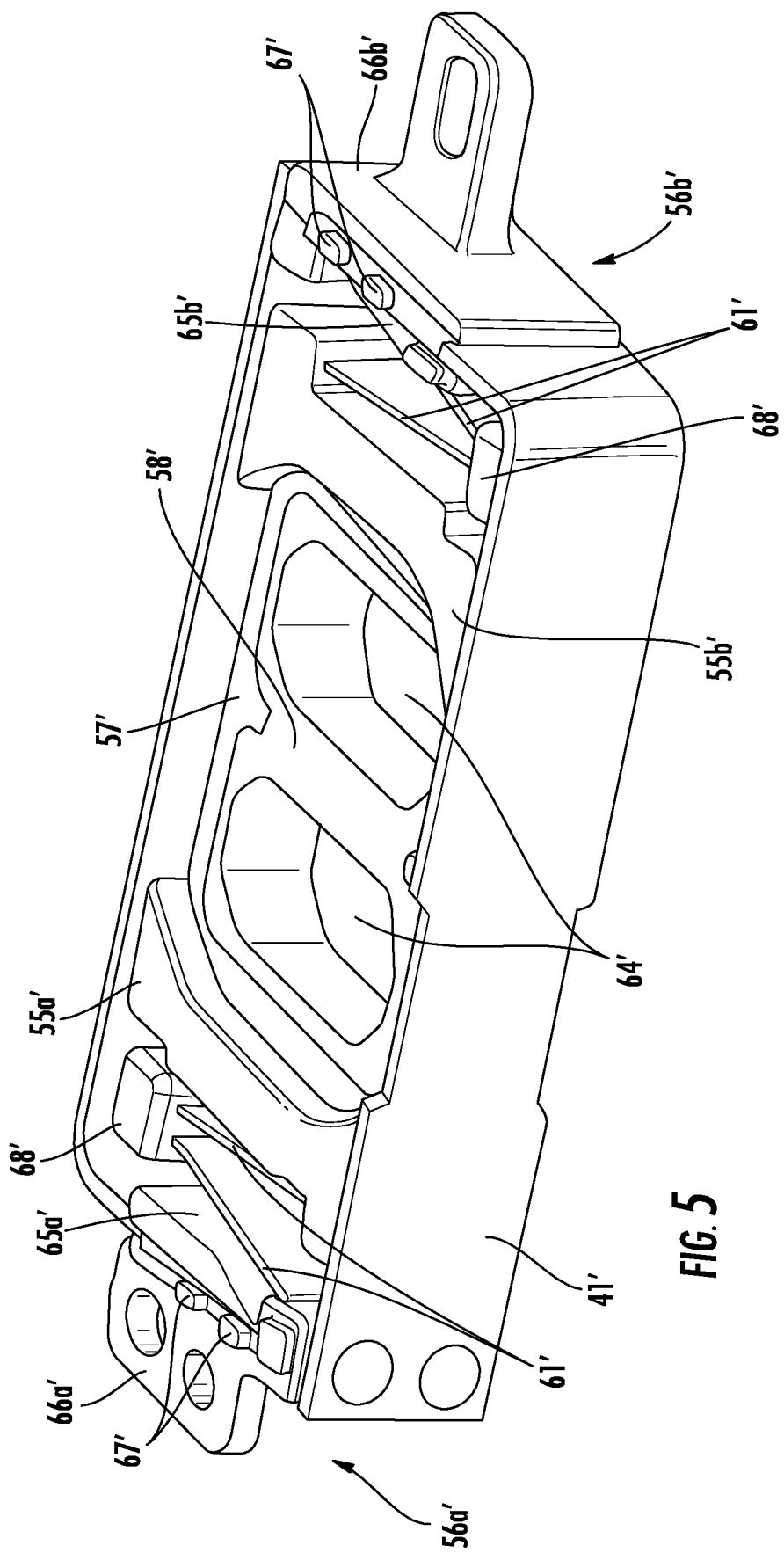
FIG. 5 is a schematic diagram of a haptic actuator in accordance with another embodiment.
Figure 6:
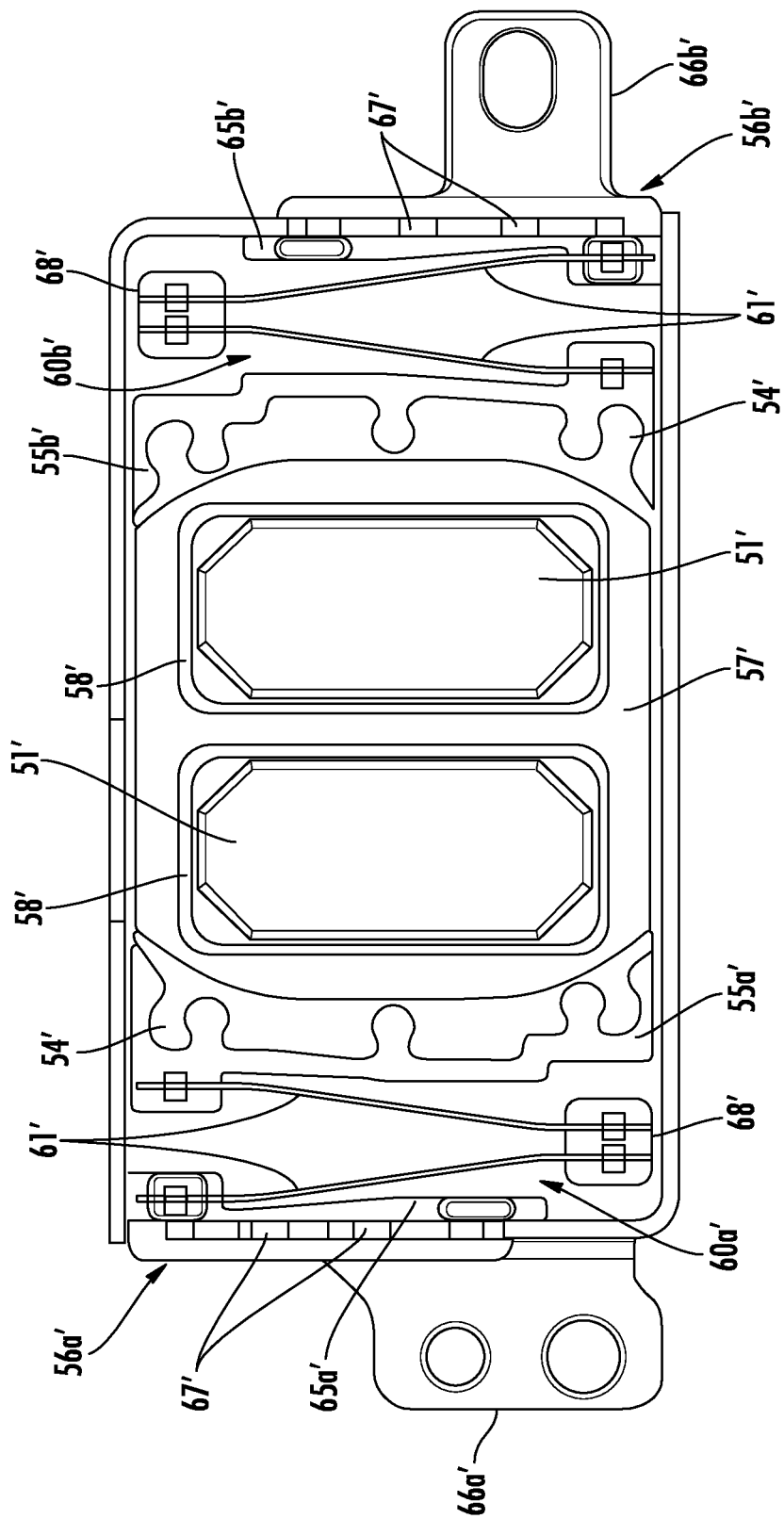
FIG. 6 is another schematic diagram of the haptic actuator of FIG. 5.

Referring now to FIGS. 5-6, in another embodiment, the first overmolded flexure mount 56*a*' includes a first flexure mounting portion 65*a*' and a first flange mounting portion 66*a*' that is integrally formed with the first flexure mounting portion. The first flange mounting portion 66*a*' may couple to cleating 67' in the actuator housing 41'. Similarly, the second overmolded flexure mount 56*b*' includes a second flexure mounting portion 65*b*' and a second flange mounting portion 66*b*' that is integrally molded with the second flexure mounting portion. The second flange mounting portion 66*b*' may couple to cleating 67' in the actuator housing 41'.

Illustratively, the first and second flexures 60*a*', 60*b*' do not include a bend. Instead the diverging arms 61' of each of the first and second flexures 60*a*', 60*b*' may be coupled by way of a respective flexure overmold 68'. As will be appreciated by those skilled in the art, by overmolding the flexures 60*a*', 60*b*' as described herein, the bend may be removed, and thus, formability may be improved. Moreover, overmolding the flexures 60*a*', 60*b*' (i.e., without the bend) enables a full constrained layer damping (CLD) beam flexure with increased strength and/or damping properties relative to non-overmolded (including a bend) flexures. In some embodiments, respective flexure overmolds 68' may not be used (i.e., the flexures 60*a*', 60*b*' each include a bend coupling the diverging arms 61').

As will be appreciated by those skilled in the art, the haptic actuator 40 described herein may include a reduced part count, and may include reduced welding, gluing, and inspection operations relative to prior art haptic actuators, for example, by reducing and combining processes. Additionally, complexity of docking or mounting the field member 50 and flexures 60*a*, 60*b* within the actuator housing 41, may be reduced as the molded components may be considered self-aligning. With respect to volume efficiency, as described above, for example, mold features and tungsten powder compounding may be utilized to increase material volume and shapes. The use of compound materials and mold strategic shapes/locations of the haptic actuator 40 may also optimize resonance and damping characteristics.

With respect to drop shock, flexure breakage may be reduced since overmolding is typically done at lower temperatures relative to welding, for example. Moreover, the materials and shapes may be chosen to define moldable shock tolerant features, for example, crash stops.

In some embodiments, the frame 57 may be entirely plastic. For example, the frame 57, as being entirely plastic, may be integrally molded with the first and second overmolded endcaps 55*a*, 55*b*. Other and/or additional components may also be plastic and integrally molded with the fully plastic frame 57.

A method aspect is directed to a method of making a haptic actuator 40. The method includes mounting at least one coil 44, 45 within a housing 41 and mounting a field member 50 movable within the housing responsive to the at least one coil. The field member 50 includes a frame 57 having opposing first and second ends 53*a*, 53*b*, at least one magnet 51 carried by the frame, a first overmolded endcap 55*a* coupled to the first end of the frame, and a second overmolded endcap 55*b* coupled to the second end of the frame. The method also includes coupling a first flexure 60*a* having an inner end to the first overmolded endcap 55*a*, and coupling an outer end to adjacent portions of the housing 41. The method further includes coupling a second flexure 60*b* having an inner end to the second overmolded endcap 55*b*, and coupling an outer end to adjacent portions of the housing 41.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A haptic actuator comprising:
   an actuator housing and at least one coil carried thereby;
   a field member movable within the actuator housing responsive to the at least one coil, the field member comprising a frame, at least one magnet carried by the frame, and a first overmolded endcap covering a first end of the frame;
   a first overmolded flexure mount carried by the actuator housing; and
   a first flexure having an inner end embedded into the first overmolded endcap, and an outer end embedded into the first overmolded flexure mount.

2. The haptic actuator of claim 1, wherein the first overmolded flexure mount comprises a first flexure mounting portion and a first flange mounting portion integrally formed therewith.

3. The haptic actuator of claim 1, wherein the field member comprises a second overmolded endcap covering a second end of the frame; and comprising a second overmolded flexure mount carried by the housing, and a second flexure having an inner end embedded into the second overmolded endcap and an outer end embedded within the second overmolded flexure mount.

4. The haptic actuator of claim 3, wherein the second flexure mount comprises a second flexure mounting portion and a second flange mounting portion integrally formed therewith.

5. The haptic actuator of claim 3, wherein the first end of the frame is embedded into the first overmolded endcap, and the second end of the frame is embedded into the second overmolded endcap.

6. The haptic actuator of claim 1, wherein the frame has at least one magnet receiving opening extending therethrough; and comprising an overmolded magnet receiving holder coupled to the frame and lining the at least one magnet receiving opening; and wherein the at least one magnet is within the at least one magnet receiving opening.

7. The haptic actuator of claim 1, wherein the at least one magnet receiving opening comprises a pair of side-by-side magnet receiving openings; and wherein the at least one magnet comprises a pair of magnets.

8. The haptic actuator of claim 1, wherein the frame comprises metal; wherein the first flexure comprises metal; and wherein the first overmolded endcap comprises plastic.

9. An electronic device comprising:
a housing and wireless communications circuitry carried thereby;
a haptic actuator within the housing and comprising
an actuator housing and at least one coil carried thereby,
a field member movable within the actuator housing responsive to the at least one coil, the field member comprising a frame, at least one magnet carried by the frame, and a first overmolded endcap covering a first end of the frame,
a first overmolded flexure mount carried by the actuator housing, and
a first flexure having an inner end embedded into the first overmolded endcap, and an outer end embedded into the first overmolded flexure mount; and
a controller carried by the housing and coupled to the wireless communications circuitry and the haptic actuator.

10. The electronic device of claim 9, wherein the first overmolded flexure mount comprises a first flexure mounting portion and a first flange mounting portion integrally formed therewith.

11. The electronic device of claim 9, wherein the field member comprises a second overmolded endcap covering a second end of the frame; and comprising a second overmolded flexure mount carried by the housing, and a second flexure having an inner end embedded into the second overmolded endcap and an outer end embedded within the second overmolded flexure mount.

12. The electronic device of claim 11, wherein the second flexure mount comprises a second flexure mounting portion and a second flange mounting portion integrally formed therewith.

13. The electronic device of claim 11, wherein the first end of the frame is embedded into the first overmolded endcap, and the second end of the frame is embedded into the second overmolded endcap.

14. The electronic device of claim 9, wherein the frame has at least one magnet receiving opening extending therethrough; and comprising an overmolded magnet receiving holder coupled to the frame and lining the at least one magnet receiving opening; and wherein the at least one magnet is within the at least one magnet receiving opening.

15. The electronic device of claim 9, wherein the at least one magnet receiving opening comprises a pair of side-by-side magnet receiving openings; and wherein the at least one magnet comprises a pair of magnets.

16. A method of making a haptic actuator comprising:
assembling a field member to be moveable within an actuator housing responsive to at least one coil, the field member comprising a frame, at least one magnet carried by the frame, and a first overmolded endcap covering a first end of the frame; and
mounting the field member using a first flexure having an inner end embedded into the first overmolded endcap, and an outer end embedded into a first overmolded flexure mount carried by the actuator housing.

17. The method of claim 16, wherein the first overmolded flexure mount comprises a first flexure mounting portion and a first flange mounting portion integrally formed therewith.

18. The method of claim 16, wherein the field member comprises a second overmolded endcap covering a second end of the frame; and wherein mounting comprises using a second flexure having an inner end embedded into a second overmolded endcap and an outer end embedded within the second overmolded flexure mount.

19. The method of claim 18, wherein the second flexure mount comprises a second flexure mounting portion and a second flange mounting portion integrally formed therewith.

20. The method of claim 16, wherein the frame has at least one magnet receiving opening extending therethrough; and comprising an overmolded magnet receiving holder coupled to the frame and lining the at least one magnet receiving opening; and wherein the at least one magnet is within the at least one magnet receiving opening.

21. The method of claim 16, wherein the at least one magnet receiving opening comprises a pair of side-by-side magnet receiving openings; and wherein the at least one magnet comprises a pair of magnets.

\* \* \* \* \*